United States Patent [19]

Hollis et al.

[11] Patent Number: 4,688,448

[45] Date of Patent: Aug. 25, 1987

[54] DRIVE MECHANISM FOR SEARCHLIGHTS

[75] Inventors: Richard E. Hollis, Springfield; Mark D. Greene, Xenia, both of Ohio

[73] Assignee: ITT Corporation, New York, N.Y.

[21] Appl. No.: 822,460

[22] Filed: Jan. 27, 1986

[51] Int. Cl.[4] .............................................. F16H 37/00

[52] U.S. Cl. .................................... 74/665 L; 74/841

[58] Field of Search ............. 74/665 L, 665 N, 665 P, 74/606 R, 421 A, 840, 841, 409

[56] References Cited

U.S. PATENT DOCUMENTS

| | | | |
|---|---|---|---|
| 2,333,341 | 11/1943 | Scrivener | 74/665 L |
| 2,434,101 | 1/1948 | Esseling | 74/841 |
| 2,510,330 | 6/1950 | Claus et al. | 74/840 |
| 2,581,123 | 1/1952 | Merkle | 74/421 A |
| 2,771,786 | 11/1956 | Gilbert et al. | 74/606 |
| 3,105,397 | 10/1963 | Hayden | 74/841 |
| 3,160,033 | 12/1964 | Moyer | 74/841 |
| 3,739,652 | 6/1973 | Caldwell et al. | 74/421 A |
| 4,000,661 | 1/1977 | Menzel | 74/841 |
| 4,524,643 | 6/1985 | Ziegler | 74/409 |

*Primary Examiner*—Leslie Braun
*Assistant Examiner*—David Novais
*Attorney, Agent, or Firm*—Menotti J. Lombardi

[57] ABSTRACT

A motorized drive is provided, of a type which includes a pair of coaxial shafts that are individually motor driven, which is especially economical to manufacture and assemble, while providing reliable operation. The drive includes coaxial shafts and upper and lower assemblies that each includes a motor mounted on a plate disposed about the shaft, a gear disposed about the shaft and driven by the motor, and a tapered bushing which couples the gear to a corresponding shaft. A coil spring disposed around the shafts presses the upper and lower assemblies apart to urge the tapered bushings into the tapered holes of the gears to couple them.

6 Claims, 3 Drawing Figures

DRIVE MECHANISM FOR SEARCHLIGHTS

BACKGROUND OF THE INVENTION

A motorized searchlight drive mechanism can include motor-driven coaxial shafts, one for turning a searchlight about a vertical axis, and the other used to pivot the search light to direct it at different elevations. Prior drive mechanisms have typically included a pair of motors mounted on a cast metal housing and engaged with gears fixed to the shafts. This has the disadvantage that each motor has to be individually mounted on the housing, and that the housing must be sufficiently stiff and precise so each motor-driven output gear accurately engages a corresponding gear on one of the shafts. In certain applications such as for the searchlight drive mechanism, it is desirable to dampen rotation of each shaft, to prevent the shaft from turning under moderately low forces, such as from the wind, while allowing the shaft to be turned when forced by hand as to enable the searchlight to be forced to turn when the motor is not energized. A drive mechanism which could be constructed at very low cost, and which overcame many of the disadvantages of prior drive mechanisms, would be of considerable value.

SUMMARY OF THE INVENTION

In accordance with one embodiment of the present invention, a drive mechanism is provided which is of low cost. The mechanism includes a shaft that can project through a hole in a housing, a motor-driven gear on the shaft, a split bushing with a tapered end lying within a tapered hole in the gear, and a spring pressing against the bushing. The spring urges the split bushing into the tapered hole in the gear to simultaneously clamp the bushing on the shaft and couple the bushing to the gear so the gear turns with the shaft. A friction pad can be mounted near the inside surface of the housing, so the spring pushes the gear against the friction pad to dampen rotation of the gear and shaft. A motor plate can lie on the shaft near the inside surface of the housing to support a motor engaged with the gear lying about the shaft. This allows the shaft and other elements on it to be assembled as a unit prior to installation in the housing. Where two coaxial shafts are required, the inner shaft can include a projecting end within the housing, a second bushing fixed to the projecting inner shaft end with the second bushing having a tapered end received in a tapered hole of a second gear, and a second motor plate with an output shaft engaged with the second gear. A coil spring extending around the outer shaft, presses the first bushing against the first gear, and urges the second gear against the second bushing, to simultaneously provide a slipable rotational coupling between each motor and the shaft it drives.

The novel features of the invention are set forth with particularily in the appended claims. The invention will be best understood from the following description when read in conjunction with the accompanying drawings.

DESCRIPTION OF THE PREFERRED EMBODIMENT

Figure 1:
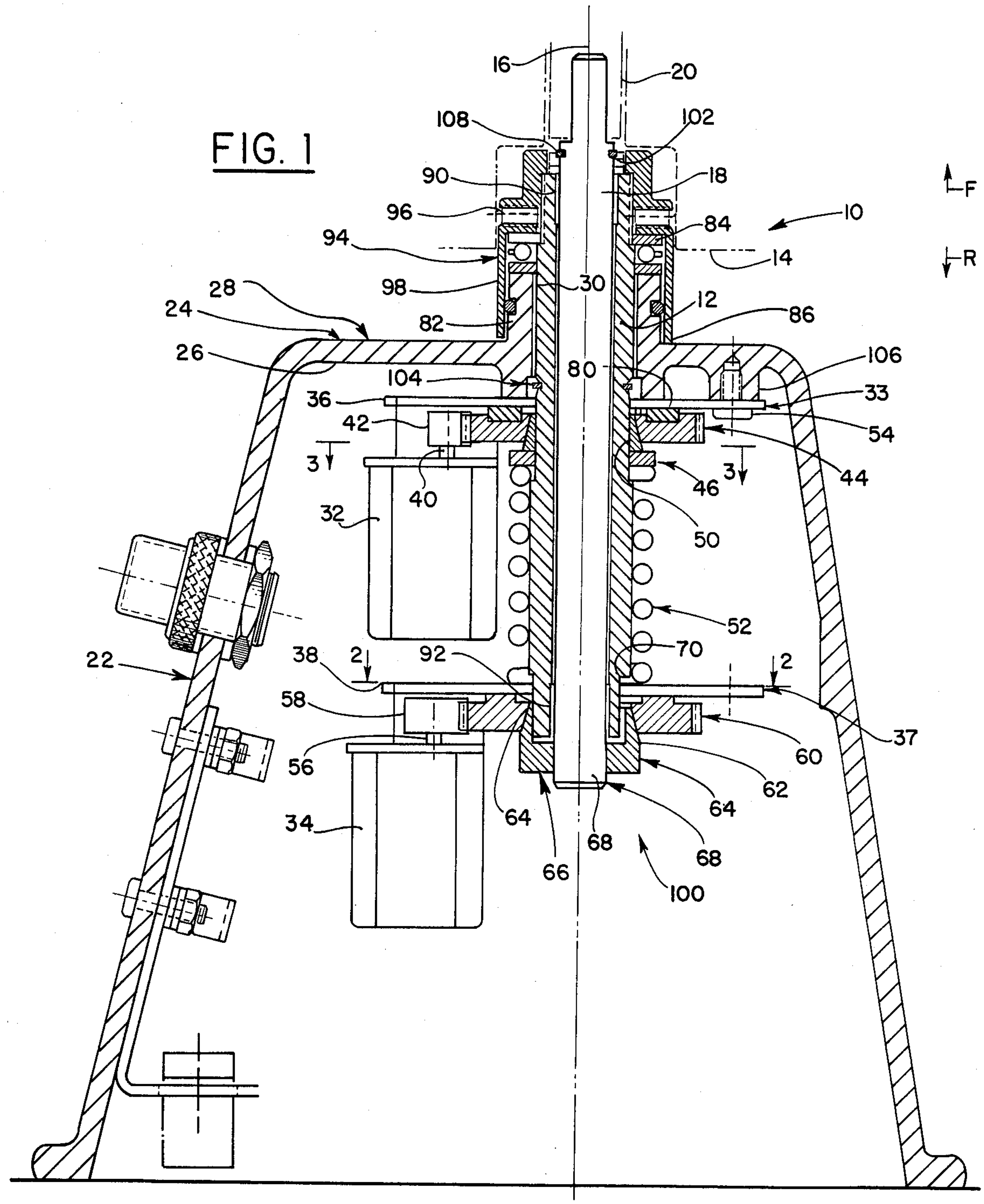
FIG. 1 is a sectional side view of a drive system constructed in accordance with the present invention.
Figure 3:
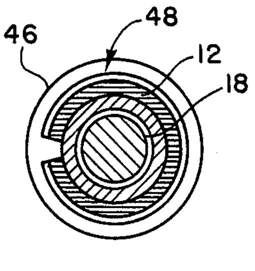

FIG. 1 illustrates a motorized searchlight drive mechanism at 10 which includes a first or outer shaft 12 for turning a searchlight assembly 14 about a vertical axis 16. The mechanism also includes a second or inner shaft 18 which is concentric with the outer shaft and which turns independently of it to operate an elevation control assembly 20 that changes the elevation of the searchlight. The latter assembly may comprise a conventional radiused rack and pinion mechanism of the type used in ITT Corp. searchlights sold under the model designation 41020-0010. The shafts rotate within a housing 22 which has an end plate portion 24. The end plate portion has a rearward side 26 and a forward side 28. The end plate portion has a hole 30 extending from the inside of the housing at the rearward side 26, to the outside of the housing at the forward side 28. Each shaft is driven by a motor, the outer shaft being driven by an outer shaft motor 32, and the inner shaft being driven by an inner shaft motor 34.

Each motor 32, 34 is mounted on a corresponding motor plate 36, 38 that lies about the axis 16 of the shafts and is supported on the plate. The combination of a motor plate and motor may be considered as a motor plate assembly 33 or 37. The outer shaft motor 32 has an output shaft 40 with a gear 42 on it which engages a first or forward main gear 44 that lies about the outer shaft but is not rotationally fixed to it. A split bushing 48 with a conically tapered forward end lies behind the main gear, and is received in a correspondingly tapered hole 50 of the gear. A washer 46 lies behind the split bushing. A coil spring 52 urges the split bushing in a forward direction indicated by arrow F to press its tapered end into the gear hole. As the split bushing is pushed forward, the walls of the gear hole 50 tighten the bushing around the shaft to clamp it thereto, and also firmly engage the main gear with the bushing. This results in the gear 44 being clamped to the shaft to rotate therewith.

In order for the motor 32 to be able to turn the gear 44, the motor plate 36 must be fixed against rotation about the shaft axis 16. This is accomplished by the use of a fastener 54, typically a screw, that secures the motor plate to the housing.

The rearward motor 34, which is mounted on the rearward plate 38, has an output shaft 56 which holds a gear 58 that turns a second main gear 60. The main gear 60 has a tapered hole 62 which receives the tapered forward end 64 of a bushing 66. The bushing 66 is fixed to the rear end of the inner shaft by press fitting the bushing onto the projecting rear end 68 of the inner shaft. The coil spring 52 presses in a rearward direction R against the rearward motor plate 38 to press against the second main gear 60 to engage it with the rearward bushing 66.

Figure 2:
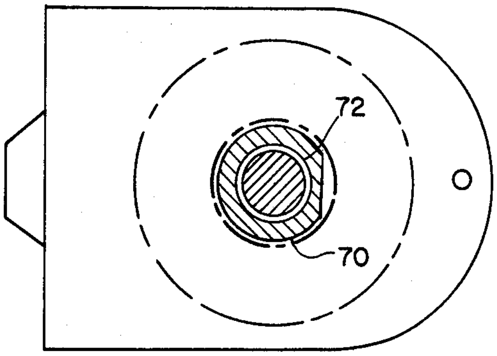

The inner shaft motor 34 must rotate with the outer shaft, so if the motor 34 is not energized, the two shafts can turn together. This allows the searchlight assembly 14 to direct the searchlight in different directions, while the elevation of the searchlight remains constant when the inner shaft motor is de-energized. To assure that the rearward motor plate 38 will rotate with the outer shaft, a hole 70 in the rearward motor plate is non-circular, FIG. 2 showing a flat spot 72 in the hole. The "D"

spring 52 can push the rearward motor plate rearwardly against the second gear 60 and engage it with the rearward bushing.

The searchlight assembly 14 must be capable of retaining its orientation despite moderate winds, and yet it must be capable of being turned when forced to do so by the hands of the operator as when the outer shaft motor is de-energized or is not working. The split bushing in conjunction with the spring force provides adequate friction for this. In addition, the movement of the searchlight assembly 14 must be smooth and steady to provide high visibility. Such smooth movement is provided by a friction pad 80 which lies between the forward motor plate 36 and the forward gear 44 to provide moderate resistance to turning of the gear 44 with respect to the motor plate. This resistance dampens the vibration of the searchlight caused by gear mesh and backlash.

The housing includes a flange 82 extending forwardly from the end plate portion 24, and supporting a bearing 84. The outer shaft 12 is supported on the bearing 84, primarily against axial movement. Another bearing 86 rotatably supports the outer shaft on the flange of the housing, while bearings 90, 92 rotatably support the inner shift within the outer shaft. A cap 94 has a forward end fixed by set screws 96 to the outer shaft. The cap has a rearward portion 98 that surrounds the flange.

The arrangement shown in FIG. 1 is conducive to lowcost manufacture. The outer shaft 12 and all parts supported on it, including the inner shaft 18, and the forward motor plate 36 and all parts around the shaft that are rearward of the motor plate, are part of a drive unit 100. The drive unit 100 can be assembled prior to installing it in the housing 22. This is accomplished by press fitting the rear bushing 66 onto the inner shaft 18. The rearward motor plate assembly 37 and rearward gear 60 are moved onto the outer shaft 12 from the rear end. The inner shaft assembly is then inserted forwardly into the outer shaft. Bearing 102 and snap ring 108 are installed to retain the inner shaft in the outer shaft. The coil spring 52, washer 46, split bushing 48, forward gear 44, and forward motor plate assembly 33 are then moved rearwardly onto the outer shaft. A middle snap ring 104 holds the latter parts in place. The assembly of the drive unit away from the confines of the housing, simplifies the assembly. The mounting of the drive unit 100 on the housing, is accomplished by sliding the bearing 84 onto the outer shaft and threading the cap 94 onto the outer shaft.

The housing 22 is of relatively simple construction, as it requires only one or a few inside projections such as 106 to fix the position of the forward motor plate, but no other projections are required for mounting the motors. The fact that the positions of the motors are controlled by their mounting on the outer shaft, results in precision mounting of the motors so the gears such as 42 and their output shafts precisely engage the corresponding gears on the shafts, without requiring precision manufacture of the mounts to ensure that motors thereon will properly engage gears on the shafts.

Thus, the invention provides a drive system of relatively low cost and high reliability. A drive unit, with most of the mechanism mountable on the outer shaft prior to its installment in a housing, simplifies the manufacture and permits a housing to be used which is simpler and can be created with less precision than heretofor.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A drive system comprising:

a housing with an end plate portion which has rearward and forward sides, said end plate portion having a hole extending from the rearward side to the forward side;

a rotatably mounted shaft which projects through said hole;

a friction pad lying at the rearward side of said end plate portion around said shaft;

a gear with walls forming a central hole through which said shaft extends, said gear lying adjacent to said friction pad and on a side of the pad opposite the end plate portion, said hole being tapered;

motor means mounted within said housing for turning said gear;

a split bushing with a hole through which said shaft extends, said bushing lying on a side of said gear opposite the end plate portion, said bushing having a tapered end received in said gear hole;

spring means for resiliently urging said bushing into said gear hole, to push the gear against the plate, clamp the bushing against the shaft, and engage the tapered end of the bushing with the walls of the tapered hole of the gear, whereby the frictional contact between said friction pad and said gear permits rotation of said shaft when the motor means is de-energized or not working.

2. The drive system described in claim 1 wherein:

said shaft has an axis, and said shaft is hollow along its axis and is an outer shaft, said outer shaft having rearward and forward ends;

an inner shaft which extends through said hollow outer shaft along said axis and is rotatable relative to said outer shaft, said inner shaft having a rearward end projecting from said rearward end of said outer shaft;

a second bushing, said second bushing fixed to said rearward end of said inner shaft and having a tapered outside;

a second gear lying around said shaft axis between the second bushing and the first gear, said second gear having a tapered central hole receiving said tapered outside of said second bushing;

said spring means urging said second gear onto said second bushing.

3. The drive system described in claim 2 including:

a forward motor plate assembly mounted to said housing and forming said motor means, said assembly including a forward plate with a hole receiving said outer shaft, and a motor on said plate, said motor having an output shaft coupled to said first mentioned gear to turn it;

a rearward motor plate assembly located on said outer shaft, on a side of said second gear which is opposite said rearward end of said second shaft, said rearward assembly including a rearward plate rotationally fixed to said outer shaft but being slideable therealong, and a motor on said plate and having an output shaft coupled to the second gear;

said spring means comprising a coil spring lying about said outer shaft, with one spring end pressing toward the first named bushing and the other spring end pressing toward the rearward plate.

4. The drive system of claim 1 further including a retaining plate mounted on said shaft, said spring means being positioned between said split bushing and said retaining plate.

5. In a drive system which includes a housing which is to support two independently motor-driven shafts, the improvement of a drive unit that can be assembled apart from the housing and then easily installed on the housing, comprising:

a hollow outer shaft having an axis, and an inner shaft lying within the outer shaft and rotatable therewithin, said shafts having rearward and forward ends, and said inner shaft having a rearward end projecting beyond the rearward end of the outer shaft;

a second bushing fixed to the rearward end of said inner shaft, said bushing having a forward end which is tapered;

a second gear which lies about said axis and has a tapered central hole which receives said tapered end of said second bushing;

a second motor plate assembly including a second motor plate lying on the forward end of said second gear, said second plate disposed about said outer shaft and slideable along said axis thereon but resisting rotation about said axis relative to the outer shaft, and a motor mounted on said second plate and having an output shaft coupled to said second gear to rotate it, to thereby rotate the inner shaft relative to the outer shaft;

a coil spring disposed around said outer shaft forward of said second plate and having forward and rearward ends, said spring rearward end urging said second plate against said second gear;

a first bushing which lies about said outer shaft at a forward end of said coil spring, said first bushing being split and having a tapered forward end;

a first gear rotatably mounted about said outer shaft and having a tapered central hole receiving said tapered end of said first bushing;

a first motor assembly including a first motor plate lying beyond a forward end of said first gear, and a motor mounted on said first plate and having an output shaft coupled to said first gear to rotate it;

said first motor assembly having means for coupling the first motor plate to the housing to prevent its rotation relative to the housing, whereby the drive unit can be assembled as a unit apart from the housing and easily installed therein.

6. The improvement described in claim 5 wherein:

said housing includes an end plate which has rearward and forward surfaces, a through hole, and a flange extending around the outer portion of said through hole; and including a cap which has a forward end engaged with the forward end of said outer shaft and a portion that extends around said flange of said housing; and a bearing surrounding the forward end of said outer shaft, lying on said flange, and trapped between the shaft and the cap.

* * * * *